W. B. AITKEN.
Car-Axle Box.
No. 40,729.
2 Sheets—Sheet 1.
Patented Dec. 1, 1863.
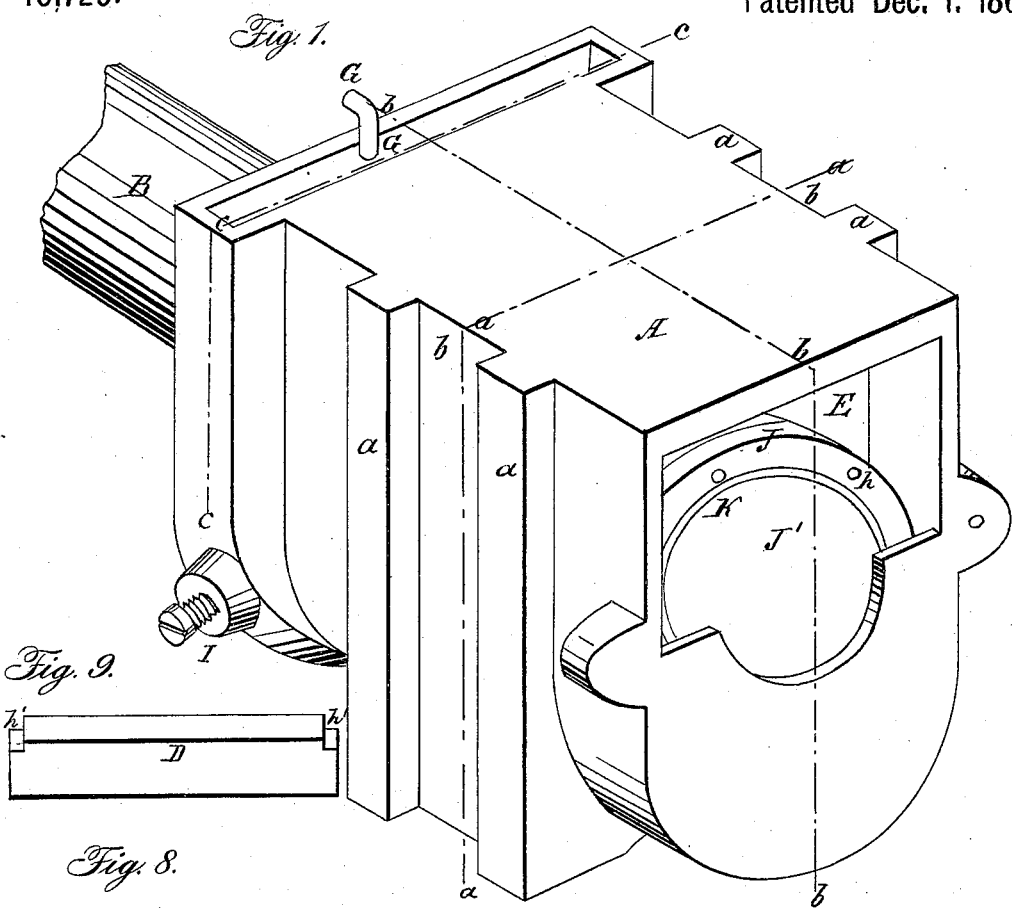
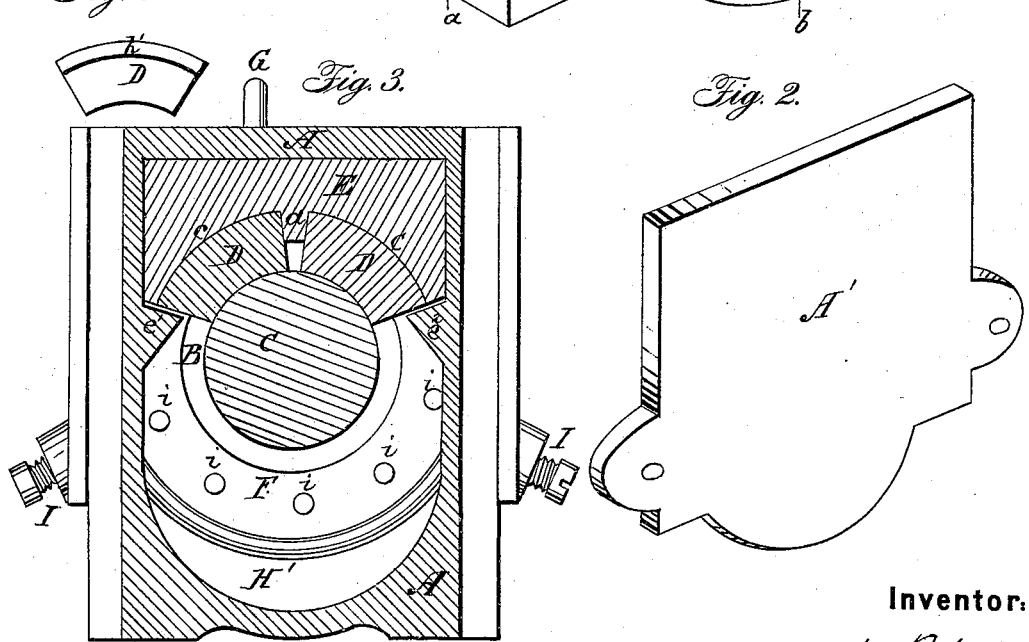
Inventor:
Wm B Aitken.

W. B. AITKEN.
Car-Axle Box.
No. 40,729.
2 Sheets—Sheet 2.
Patented Dec. 1, 1863.
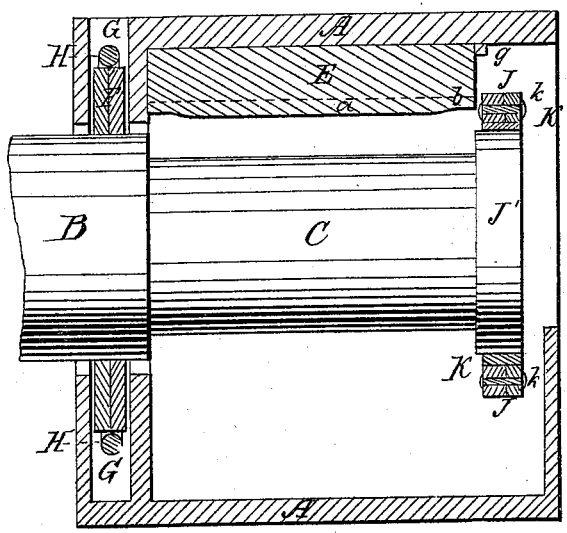
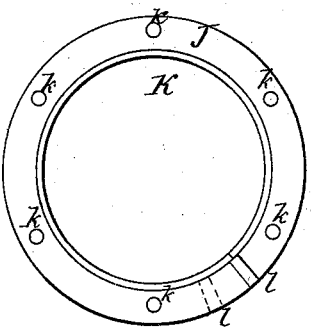
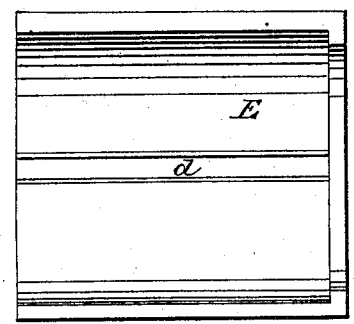
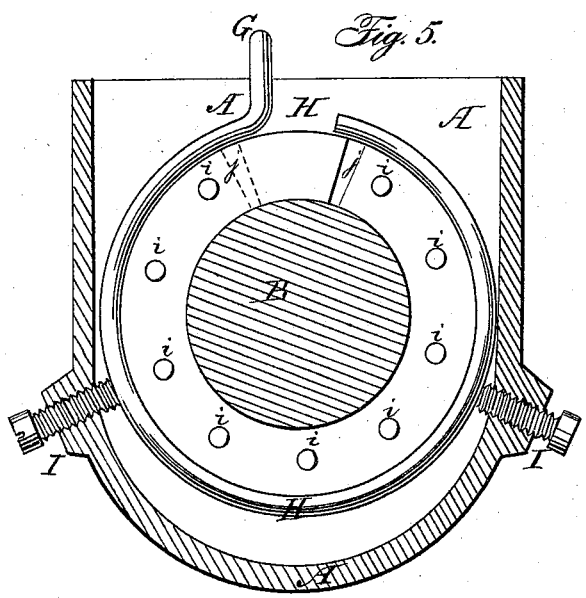
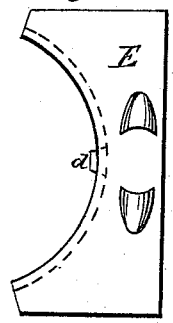
Inventor:
Wm B Aitken

UNITED STATES PATENT OFFICE.

WILLIAM B. AITKEN, OF PHILADELPHIA, PENNSYLVANIA, ASSIGNOR TO HIMSELF AND JAMES H. HAYNES, OF SAME PLACE.

IMPROVEMENT IN JOURNAL-BOXES FOR RAILROAD-CARS.

Specification forming part of Letters Patent No. 40,729, dated December 1, 1863.

*To all whom it may concern:*

Be it known that I, WILLIAM B. AITKEN, of the city of Philadelphia and State of Pennsylvania, have invented a new and useful Improvement in Journal-Boxes for Railroad-Cars; and I do hereby declare that the following is a full and exact description thereof, reference being had to the annexed drawings, making a part of this specification, in which—

Figure 1 is a perspective view of a car-box and one end of a shaft, the cap of the box being left off for the purpose of showing the interior arrangement of the latter. Fig. 2 is a perspective view of the cap of the box detached. Fig. 3 is a cross-section at the line *a a a* of Fig. 1. Fig. 4 is a longitudinal perpendicular section at the line *b b b* of Fig. 1. Fig. 5 is a cross-section at the line *c c c* of Fig. 1. Fig. 6 is a side view of the oil-distributing ring or collar K and connecting-spring J, the detached from the journal-flange K'. Fig. 7 is an edge view of the same. Fig. 8 is an end view of one of the brass bearings, D. Fig. 9 is an end view of the same. Fig. 10 is a face view of the support or seat-block E. Fig. 11 is an end view of the same.

Like letters in all the figures represent the same parts.

The nature of my invention will be understood by the following description.

To enable others skilled in the art to make and use my invention, I describe its construction and operation as follows:

A is the journal-box. It has perpendicular ribs *a a a a* on its perpendicular sides, which form the grooves *b b*, that fit on the pedestal in the usual manner. A particular description is therefore deemed unnecessary.

A' is the cap of the box, it being represented in Fig. 2.

B is a portion of one end of the shaft having a journal, C.

D D are journal-bearings.

E is a support-block, which has circular seats *c c* for the bearings D D. The said seats may be made flat, if desired. If so made, they must be at right angles to central lines at radii with the shaft C, to allow the bearings to be reversed to obviate the difficulty arising from the unequal wearings of the inner and the outer ends and the inner and outer edges of the same.

In the middle of the support or seat block E there is a longitudinal rib, *d*, which supports the inner edges of ribs D D, and on the perpendicular sides of the box A there are longitudinal ribs or ledges *e e*, which support the outer edges of the bearings, the said ribs being either cast with or securely attached thereto. The longitudinal rib *d* may be dispensed with when it may be desired to have the inner edges of the bearings D D touch each other or to employ a single bearing. The said bearings are represented in the drawings as having their edges at radii with the journal C for the purpose of making them reversible, the converging edges of the rib *d* and the upper edge, 1 and 2, of the ledges *e e* being also at radii with the journal. The same result may be obtained, however, with the different direction or angle of the edges of the bearings if they are made equal to one another and the edges of the ribs are made to correspond to them.

Besides providing for the reversibility of the bearings D D, as described, the construction and arrangement of the ribs *d*, *e*, and *e* are such as to form dovetail-chambers for the bearings, the object of which is to keep them in their places when the car is jacked up at any time.

In the box A, near its outer edge, is a cross ledge or rib, *g*, which prevents the support or seat-block E moving outward if the cap A should become loose. The block E has a lip, *h*, which prevents the bearings D D sliding out of their places, there being rabbets *h h* at the ends of the bearings which fit the said lip.

F is an adjustable packing-ring which encircles the shaft B. I have represented it in the drawings as composed of two pieces of leather fastened together by means of the rivets *i*. They have cross-openings *j j*, for the purpose of accommodating the ring to the size of the shaft at all times. The said ring is situated in the chamber G of the box A, as represented in the Figs. 4 and 5.

H is an open ring, which I usually make of wire. It is placed around the packing-ring F, and by means of the adjusting-screws I I is made to bear against the periphery of the same to press the interior edge against the shaft B, to keep the journal free from dust and prevent the oil pressing out of the box. The adjusting-screws I I are placed at radii, or nearly so, with the journal C, and somewhat below its center, to insure the packing-ring F fitting the lower side of the shaft B, so as to prevent the escape of the oil from the journal.

J is a lubricating-collar which surrounds the flange J on the end of the journal C. It is held in place by means of the open circular spring K, that is interposed between it and the flange.

I have described the collar J in the drawings as composed of two pieces of leather in the manner of the packing-ring F, said pieces having cross-openings $l\ l$, and being held together by means of the rivet $k$, although one piece of leather is sufficient.

Instead of leather, cork or other elastic and soft substance may be used for the ring F and collar J.

Having thus fully described the construction and operation of the car-box as invented or improved by me, what I claim therein as new, and desire to receive by Letters Patent, is—

1. Combining and arranging the reversible bearing D D, or their equivalents, with the support-block E and box A with the converging support-ribs $e\ e$, substantially as described, and for the purposes set forth.

2. The combination and arrangement of the packing-ring F, chamber G, spring-ring H, and adjusting-screws I I with the shaft B, the whole being constructed and arranged to operate substantially as and for the purposes set forth.

3. Arranging the lubricating-collar J on the outer edge of the journal C by means of the spring-ring K, or its equivalent, substantially as described, and for the purpose set forth.

WM. B. AITKEN.

Witnesses:
   SAML. T. BILLMEYER,
   T. ANDREW LYLE.